United States Patent
Frank

(10) Patent No.: US 8,183,538 B2
(45) Date of Patent: *May 22, 2012

(54) SENSOR INTERFACE SYSTEM

(75) Inventor: David L. Frank, Highland Beach, FL (US)

(73) Assignee: Innovative American Technology Inc., Coconut Creek, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/840,102

(22) Filed: Jul. 20, 2010

(65) Prior Publication Data

US 2011/0015886 A1   Jan. 20, 2011

Related U.S. Application Data

(63) Continuation of application No. 11/931,370, filed on Oct. 31, 2007, now Pat. No. 7,759,649, which is a
(Continued)

(51) Int. Cl.
*G01T 1/00* (2006.01)
(52) U.S. Cl. .................. 250/394; 250/370.15
(58) Field of Classification Search ............. 250/370.15, 250/582
See application file for complete search history.

(56) References Cited

U.S. PATENT DOCUMENTS 3,872,287 A   3/1975   Koeman
(Continued)

FOREIGN PATENT DOCUMENTS

JP   55050178 A   4/1980
(Continued)

OTHER PUBLICATIONS

International Preliminary Report on Patentabiilty for PCT/US06/46255 mailed Sep. 24, 2008.
(Continued)

*Primary Examiner* — David Porta
*Assistant Examiner* — Hugh H Maupin
(74) *Attorney, Agent, or Firm* — Jose Gutman; Fleit Gibbons Gutman Bongini & Bianco PL

(57) ABSTRACT

A sensor interface system interfaces a collection of one or more sensors that can sense chemical, biological, radiation, nuclear, and explosives (CBRNE) materials. The system includes one or more digital and/or analog sensor interfaces for communicating with one or more sensors including: chemical sensors, biological sensors, radiation sensors, nuclear sensors, and explosives sensors. A processor is configured to receive and process signals from the one or more digital and/or analog sensor interfaces, and when the one or more sensors include a radiation sensor and/or nuclear sensor, the processor differentiates between gamma pulses and neutron pulses, by: receiving a signal from an output of a neutron detector; analyzing a pulse shape of the signal; differentiating the pulse shape between gamma pulses and neutron pulses; and determining that the pulse shape of the signal is one of a gamma pulse and a neutron pulse.

11 Claims, 9 Drawing Sheets

Related U.S. Application Data

(63) continuation of application No. 11/564,193, filed on Nov. 28, 2006, now Pat. No. 7,851,766, which is a continuation-in-part of application No. 11/291,574, filed on Dec. 1, 2005, now Pat. No. 7,592,601, which is a continuation-in-part of application No. 10/280,255, filed on Oct. 25, 2002, now Pat. No. 7,005,982, application No. 11/931,370, which is a continuation of application No. 11/363,594, filed on Feb. 27, 2006, now Pat. No. 7,142,109, which is a continuation of application No. 12/472,707, filed on May 27, 2009, which is a continuation-in-part of application No. 11/564,193, filed on Nov. 28, 2006, which is a continuation-in-part of application No. 11/852,835, filed on Nov. 28, 2006, which is a continuation-in-part of application No. 11/624,089, filed on Jan. 17, 2007, which is a continuation-in-part of application No. 11/852,835, filed on Nov. 28, 2006, which is a continuation-in-part of application No. 11/624,089, filed on Jan. 17, 2007.

(60) Provisional application No. 60/759,332, filed on Jan. 17, 2006, provisional application No. 60/759,331, filed on Jan. 17, 2006, provisional application No. 60/759,373, filed on Jan. 17, 2006, provisional application No. 60/759,375, filed on Jan. 17, 2006, provisional application No. 60/347,997, filed on Oct. 26, 2001, provisional application No. 60/631,865, filed on Dec. 1, 2004, provisional application No. 60/655,245, filed on Feb. 23, 2005, provisional application No. 60/849,350, filed on Oct. 4, 2006, provisional application No. 61/128,947, filed on May 27, 2008.

(56) References Cited

U.S. PATENT DOCUMENTS

| | | | |
|---|---|---|---|
| 4,158,773 A | 6/1979 | Novak | |
| 4,535,246 A | 8/1985 | Shani | |
| 4,799,828 A | 1/1989 | Georgii | |
| 5,056,958 A | 10/1991 | Campbell | |
| 5,241,573 A | 8/1993 | Thacker | |
| 5,298,756 A | 3/1994 | McCollum et al. | |
| 5,308,986 A | 5/1994 | Walker | |
| 5,434,415 A | 7/1995 | Terada et al. | |
| 5,633,508 A | 5/1997 | Schleppenbach | |
| 5,665,970 A | 9/1997 | Kronenberg et al. | |
| 5,838,759 A | 11/1998 | Armistead | |
| 5,866,907 A | 2/1999 | Drukier et al. | |
| 6,011,266 A | 1/2000 | Bell | |
| 6,370,222 B1 | 4/2002 | Cornick, Jr. | |
| 6,407,390 B1 | 6/2002 | Rozsa | |
| 6,433,335 B1 | 8/2002 | Kronenberg et al. | |
| 6,479,826 B1 | 11/2002 | Klann et al. | |
| 6,515,285 B1* | 2/2003 | Marshall et al. | 250/352 |
| 6,545,281 B1 | 4/2003 | McGregor et al. | |
| 6,845,873 B1 | 1/2005 | Chattey | |
| 6,891,470 B2 | 5/2005 | Bohinc, Jr. | |
| 6,937,692 B2 | 8/2005 | Johnson et al. | |
| 6,980,483 B2 | 12/2005 | McDonald | |
| 6,998,617 B2 | 2/2006 | D'Emilio et al. | |
| 7,026,944 B2 | 4/2006 | Alioto et al. | |
| 7,030,755 B2 | 4/2006 | Bohinc, Jr. | |
| 7,064,336 B2 | 6/2006 | Archer et al. | |
| 7,115,875 B1 | 10/2006 | Worstell | |
| 7,116,235 B2 | 10/2006 | Alioto et al. | |
| 7,142,109 B1 | 11/2006 | Frank | |
| 7,151,447 B1 | 12/2006 | Willms et al. | |
| 7,164,138 B2 | 1/2007 | McGregor et al. | |
| 7,183,554 B2 | 2/2007 | Gallagher et al. | |
| 7,269,527 B1* | 9/2007 | Frank | 702/108 |
| 7,324,921 B2 | 1/2008 | Sugahara et al. | |
| 7,356,115 B2 | 4/2008 | Ford et al. | |
| 7,391,028 B1 | 6/2008 | Rubenstein | |
| 7,411,198 B1 | 8/2008 | Holland et al. | |
| 7,550,738 B1 | 6/2009 | DeVito | |
| 7,592,601 B2 | 9/2009 | Frank | |
| 7,759,649 B2 | 7/2010 | Frank | |
| 7,851,766 B2 | 12/2010 | Frank | |
| 2002/0175291 A1 | 11/2002 | Reeder et al. | |
| 2003/0108150 A1 | 6/2003 | Franke | |
| 2003/0144800 A1 | 7/2003 | Davis et al. | |
| 2003/0165211 A1 | 9/2003 | Grodzins et al. | |
| 2003/0201394 A1 | 10/2003 | Peoples | 250/336.1 |
| 2004/0018060 A1 | 1/2004 | Knezek et al. | |
| 2004/0119591 A1 | 6/2004 | Peeters | |
| 2004/0126895 A1 | 7/2004 | Overbeck et al. | |
| 2004/0148137 A1 | 7/2004 | Zerwekh et al. | |
| 2005/0001728 A1 | 1/2005 | Appelt et al. | |
| 2005/0011849 A1 | 1/2005 | Chattey | 212/270 |
| 2005/0023477 A1 | 2/2005 | Archer et al. | |
| 2005/0082485 A1 | 4/2005 | Torii | |
| 2005/0135535 A1 | 6/2005 | Wallace | |
| 2005/0156734 A1 | 7/2005 | Zerwekh et al. | |
| 2005/0205793 A1 | 9/2005 | Bohinc, Jr. | |
| 2005/0220247 A1 | 10/2005 | Ruddy et al. | 376/159 |
| 2005/0224719 A1 | 10/2005 | Polichar et al. | |
| 2005/0258372 A1 | 11/2005 | McGregor et al. | |
| 2005/0275545 A1 | 12/2005 | Alioto et al. | 340/600 |
| 2006/0097171 A1 | 5/2006 | Balchunas et al. | |
| 2006/0138331 A1 | 6/2006 | Guillebaud et al. | |
| 2006/0141615 A1 | 6/2006 | Lu | |
| 2006/0284094 A1 | 12/2006 | Inbar | 250/359.1 |
| 2007/0001123 A1* | 1/2007 | Andrews et al. | 250/394 |
| 2007/0290136 A1 | 12/2007 | Ivan | |
| 2008/0023631 A1 | 1/2008 | Majors et al. | |
| 2009/0014662 A1 | 1/2009 | Suhami | |

FOREIGN PATENT DOCUMENTS

| | | |
|---|---|---|
| JP | 58223775 A | 12/1983 |
| JP | 1144768 A | 2/1999 |
| JP | 2008111677 A | 5/2008 |
| KR | 1019927004134 | 12/1992 |
| KR | 200191370 Y1 | 8/2000 |
| KR | 1020050071663 A | 7/2005 |
| WO | 9800681 | 1/1998 |
| WO | 2004027727 A1 | 4/2004 |
| WO | 2006085999 | 8/2006 |
| WO | 2007065004 A2 | 6/2007 |

OTHER PUBLICATIONS

International Search Report of the International Searching Authority for PCT/US06/46255 mailed Sep. 25, 2007.
International Search Report and Written Opinion of the International Searching Authority for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Mar. 20, 2008.
Final Rejection for U.S. Appl. No. 11/291,574 dated Dec. 2, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.

Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 19, 2010.
Non-Final Rejection for U.S. Appl. No. 11/931,211 dated Apr. 30, 2010.
Mc Gregor, Douglas S., et al, Bulk GaAs-Based Neutron Detectors for Spent Fuel Analysis, Proceedings of ICONE 8, ICONE—8827, 8th Int'l Conf. on Nuclear Engineering, Apr. 2-6, 2000, pp. 1-8, Baltimore, MD.
Klann, Raymond T., et al. Development of Coated Gallium Arsenide Neutron Detectors, Proceedings of ICONE 8, ICONE—8110, 8th Int'l Conf. on Nuclear Engineering, Apr. 2-6, 2000, pp. 1-6, Baltimore, MD.
Mc Gregor, Douglas S., et al., Designs for Thin-Film-Coated Semiconductor Thermal Neutron Detectors, Nov. 14, 2001, pp. 1-5.
Mc Gregor, Douglas S., et al., New Surface Morphology for Low Stress Thin-Film-Coated Thermal Neutron Detectors, IEEE Transactions on Nuclear Science, vol. 49, No. 4, Aug. 2002, pp. 1999-2004.
Mc Gregor, Douglas S., et al., Design considerations for thin film coated semiconductor thermal neutron detectors—I: basics regarding alpha particle emitting neutron reactive films; Nuclear Instruments and Methods in Physics Research A 500 (2003) pp. 272-308.
Shultis, J. Kenneth, et al., Efficiencies of Coated and Perforated Semiconductor Neutron Detectors, IEEE Transactions on Nuclear Science, vol. 53, No. 3, pp. 1659-1665, Jun. 2006.
Mc Neil, W.J., et al., Perforated Diode Fabrication for Neutron Detection, 2006 IEEE Nuclear Science Symposium Conference Record, pp. 3732-3735, Nov. 17, 2006.
Mc Gregor, D.S., et al., Perforated Semiconductor Neutron Detector Modules, 32nd Annual GOMAC Tech Conference, Mar. 19-22, 2007.
Mc Gregor, Douglas S., et al., Perforated Semiconductor Neutron Detector Modules for Detection of Spontaneous Fission Neutrons, IEEE Conference on Technologies for Homeland Security, May 16-17, 2007.
Shultis, Kenneth J. et al., Designs for Micro-Structured Semiconductor Neutron Detectors, Invited Paper, Proc. SPIE 7079, 70790-6 (2008) pp. 6-1: 6-15.
Mc Gregor, D.S., et al., Micro-Structured High-Efficiency Semiconductor Neutron Detectors, 2008 IEEE Nuclear Science Symposium Conference Record, pp. 446-448, Nov. 12, 2008.
Ugorowski, P., et al., Characterization of the High-Efficiency Neutron Detector Array (HENDA), 2008 IEEE Nuclear Science Symposium Conference Record, pp. 1901-1903.
Unruh, Troy C., et al., Design and operation of a 2-D thin-film semiconductor neutron detector array for use as a beamport monitor, Nuclear Instruments and Methods in Physics Research A 604 (2009) 150-153.
Mc Neil, Walter J., et al., 1-D array of perforated diode neutron detectors, Nuclear Instruments and Methods in Physics Research A 604 (2009) 127-129.
Bellinger, S.L., et al., Characteristics of 3D Micro-Structured Semiconductor High Efficiency Neutron Detectors, IEEE Transactions on Nuclear Science, vol. 56, No. 3, Jun. 2009, pp. 742-746.
Harrison, Mark J., et al., Improved Techniques for the Fabrication of Frisch Collar CdZnTe Gamma Ray Spectrometers, IEEE Transactions on Nuclear Science, vol. 56, No. 3, Jun. 2009, pp. 1671-1676.
Mc Gregor, D.S., et al., Microstructured semiconductor neutron detectors, Nuclear Instruments and Methods in Physics Research A 608 (2009) 125-131.
International Search Report and Written Opinion, PCT/US2009/047084, Jun. 11, 2009.
International Search Report and Written Opinion of the International Searching Authority for PCT/US2010/025429 dated Sep. 28, 2010.
International Search Report and Written Opinion of the International Searching Authority for PCT/US2010/025432 mailed Sep. 28, 2010.
International Preliminary Report for PCT/US2010/025429, dated Aug. 30, 2011.
International Search Report and Written Opinion of the International Searching Authority for PCT/US2010/025435 mailed Nov. 30, 2010.
Arni Heller: Smart Buoys Help Protect Submarine Base; Jan. Feb. 204; Lawrence Livermore National Laboratory; pp. 19-22.
Non-Final Office Action for U.S. Appl. No. 12/409,733, mailed Sep. 2, 2011.
Notice of Allowance for U.S. Appl. No. 12/472,707, mailed Sep. 30, 2011.

* cited by examiner

Approximate Location of Push/Pull Sensor Array on STS-45

Approximate Location of Main Unit on STS-45

MAIN CONFIGURATION

BOTTOM ISO-VIEW   TOP ISO-VIEW

MAIN CONFIGURATION

BOTTOM ISO-VIEW   TOP ISO-VIEW $B_i(X) = A_i(X) * \text{alpha} + B_{i-1}(X) * (1-\text{alpha})$

| $B_i(X) =$ | $A_i(X)$ | $* \text{alpha}$ | $+ B_{i-1}(X)$ | $* (1-\text{alpha})$ |
|---|---|---|---|---|
| New Dynamic Background | Snap Shot of Background | Learning Rate | Previous Background | Differential |

B = Calculated Background
A = Incremental Background
X = Channel Number

FIG. 9

SENSOR INTERFACE SYSTEM

CROSS-REFERENCE TO RELATED APPLICATIONS

This application is a continuation of co-pending U.S. patent application Ser. No. 11/931,370, filed on Oct. 31, 2007, which is a continuation of U.S. patent application Ser. No. 11/564,193, filed on Nov. 28, 2006, which is based on, and claims priority from, prior U.S. Provisional Patent Application No. 60/759,332, filed on Jan. 17, 2006, by inventor David L. FRANK, and entitled "Sensor Interface Unit And Method For Automated Support Functions For CBRNE Sensors"; and further which is based on, and claims priority from, prior U.S. Provisional Patent Application No. 60/759,331, filed on Jan. 17, 2006, by inventor David L. FRANK, and entitled "Method For Determination Of Constituents Present From Radiation Spectra And, If Available, Neutron And Alpha Occurrences"; and further which is based on, and claims priority from, prior U.S. Provisional Patent Application No. 60/759,373, filed on Jan. 17, 2006, by inventor David L. FRANK, and entitled "Distributed Sensor Network with Common Platform for CBRNE Devices; and further which is based on, and claims priority from, prior U.S. Provisional Patent Application No. 60/759,375, filed on Jan. 17, 2006, by inventor David L. FRANK, and entitled Advanced Container Verification System; and furthermore which is a continuation-in-part of, and claims priority from, prior co-pending U.S. patent application Ser. No. 11/291,574, filed on Dec. 1, 2005, which is a continuation-in-part of, and claims priority from, prior U.S. patent application Ser. No. 10/280,255, filed on Oct. 25, 2002, now U.S. Pat. No. 7,005,982 issued Feb. 28, 2006, that was based on prior U.S. Provisional Patent Application No. 60/347,997, filed on Oct. 26, 2001, and which further is based on, and claims priority from, prior U.S. Provisional Patent Application No. 60/631,865, filed on Dec. 1, 2004, and which furthermore is based on, and claims priority from, prior U.S. Provisional Patent Application No. 60/655,245, filed on Feb. 23, 2005, and which furthermore is based on, and claims priority from, prior U.S. Provisional Patent Application No. 60/849,350, filed on Oct. 4, 2006, and which furthermore is based on, and claims priority from, prior U.S. patent application Ser. No. 11/363,594 filed on Feb. 27, 2006, now U.S. Pat. No. 7,142,109 issued Nov. 28, 2006; the collective entire disclosure of the above-identified applications being hereby incorporated by reference. This application claims priority to co-pending U.S. patent application Ser. No. 12/472,707, filed on May 27, 2009, which is based on and claims priority to provisional U.S. Patent Application No. 61/128,947, entitled "Floating Intelligent Perimeter Sensor", filed on May 27, 2008, and is also a continuation-in-part of and claims priority from, prior co-pending U.S. patent application Ser. No. 11/564,193 entitled "Multi-Stage System for Verification of Container Contents", filed on Nov. 28, 2006, which is a continuation-in-part of, and claims priority from, prior co-pending U.S. patent application Ser. No. 11/291,574, filed on Dec. 1, 2005, which is a continuation-in-part of, and claims priority from, prior U.S. patent application Ser. No. 10/280,255, filed on Oct. 25, 2002, now U.S. Pat. No. 7,005,982 issued on Feb. 28, 2006, and that was based on prior U.S. Provisional Patent Application No. 60/347,997, filed on Oct. 26, 2001; and this application is also a continuation-in-part of and claims priority from, prior co-pending U.S. patent application Ser. No. 11/852,835 entitled "Distributed Sensor Network With A Common Processing Platform For CBMRNE Devices And Novel Applications", filed on Nov. 28, 2006, which is a continuation-in-part of U.S. patent application Ser. No. 11/624,089 filed on Jan. 17, 2007, entitled "System Integration Module For CBRNE Sensors", now U.S. Pat. No. 7,269,527; the collective entire disclosure of which being hereby incorporated by reference.

BACKGROUND OF THE INVENTION

1. Field of the Invention

This invention relates in general to sensor interface systems such as for sensors for detection of shipping container contents to detect and identify hazardous materials within containers, such as radiation and/or neutron emitting materials, explosives, and special materials such as highly enriched uranium, and further to identify the normally occurring radiological materials within containers.

2. Description of Related Art

Current attempts at providing radiation, neutron, explosives, and special materials, detection systems to verify shipping containers, such as those that have been mounted on the gantry crane arms, have a limited time to identify the isotopes present. Radiation sensor systems for detecting and identifying radiological materials held within shipping containers may not have the exposure time required to specifically identify all of the isotope types that may be present. The limited time to detect and identify the isotopes present may affect the ability to evaluate the validity of the contents. The limited time for interval provided by current shipping container detection systems, such as for use with gantry cranes, detrimentally affect the commercial viability of radiation, neutron, explosives, and special materials, detection systems and cause the containers to be manually interrogated which results in negative impacts to the flow of commerce.

Therefore a need exists to overcome the problems with the prior art as discussed above.

SUMMARY OF THE INVENTION

According to an embodiment of the present invention, a security system detects gamma and neutron radiation and hazardous materials inside shipping containers. The system detects and identifies radiation, explosives, and unauthorized hazardous materials within a shipping container. The sensors are configured as nodes on a network. The system collects data, such as radiation data, from one or more sensors. The system spectrally analyzes the collected radiation data. The system identifies one or more isotopes based on the spectrally analyzed radiation data. A central monitoring station can monitor radiation data and other data received from the sensors. Communication of sensor data can be done using TCP/IP communication over a data network.

In order to verify whether radioactive materials are concealed within a shipping container, isotope sensing and identification systems can be deployed in association with a container, such as with a crane assembly used to lift shipping and transfer containers. An isotope sensing and identification system would consist of one or more gamma and neutron detectors that provide detailed radiation spectral data to an information processing system performing spectral analysis for the detection and identification of isotope(s) that are present in the containers.

By identifying the specific isotope(s) that are present, according to one embodiment, it allows a security system to identify the types of goods or materials that the isotopes represent.

BRIEF DESCRIPTION OF THE DRAWINGS

FIG. 9 is a formula useful for dynamic background radiation effects compensation.

DETAILED DESCRIPTION

Figure 1:
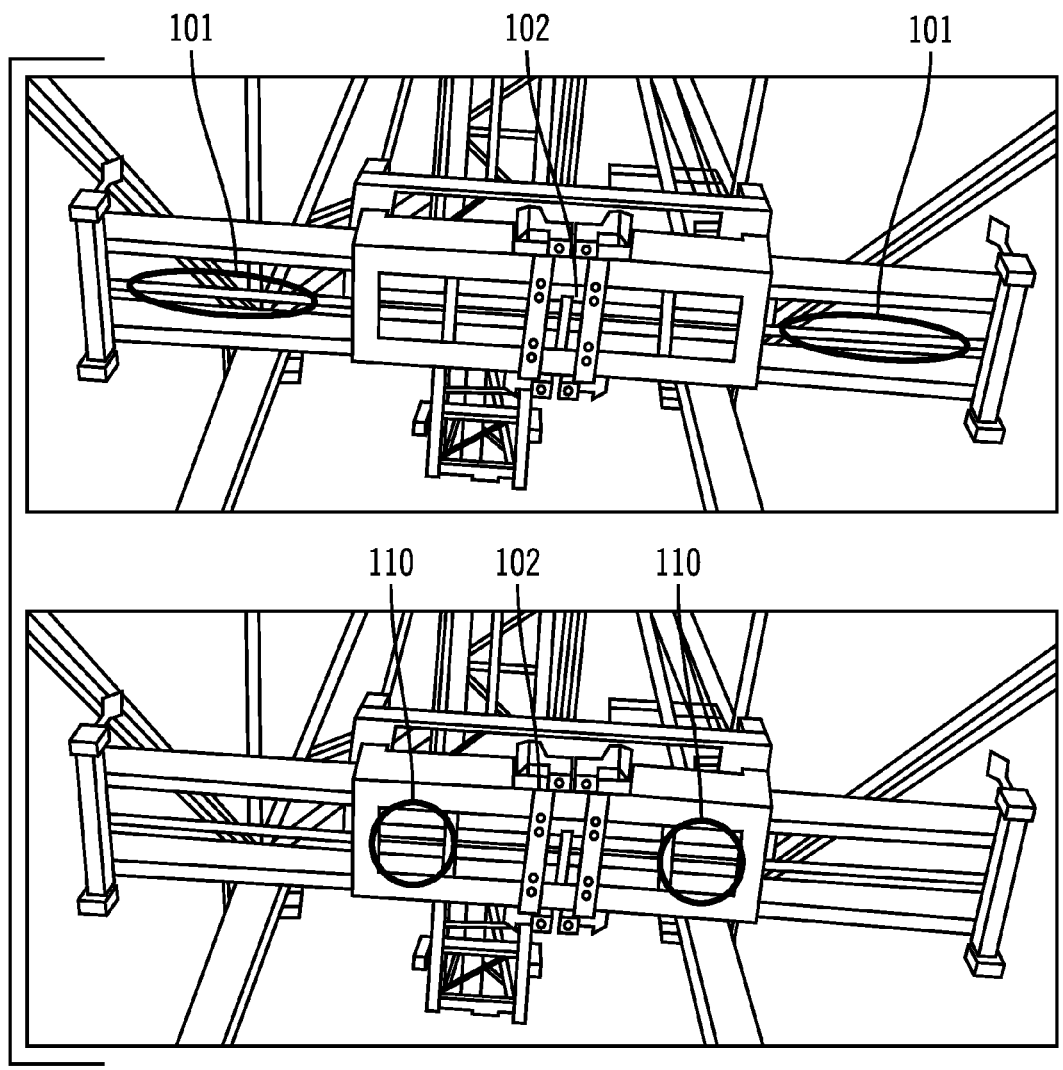
FIG. 1 is a picture depicting a container in proximity to a crane arm assembly (or a spreader bar) with sensors in sensor housings, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

The present invention, according to an embodiment, overcomes problems with the prior art by providing a multi-stage radiation verification process for the contents of a shipping container. The radiation sensor data collected at each stage of the verification process is used to enable detection and identification of the specific isotopes that are present in a container under examination.

A noninvasive container contents detection and verification system, according to an embodiment of the present invention, operates without having to enter the cavity of a container under examination. The system can include multiple radiation sensor systems that use integrated digital sensors for Gamma and neutron detection, and with a spectral analysis capability to identify the specific isotope(s) of materials in containers. The multi-stage system provides for monitoring and tracking of targeted containers that are delivered to a secondary verification station. The multi-stage system provides for network connections between the spreader bar position and the secondary verification position to enable information integration. Such a multi-stage system can also include detection and identification of explosives and special materials in containers. These special materials may include highly enriched uranium.

An embodiment of the invention includes radiation sensors deployed on the spreader bar of a gantry crane to provide radiation detection and isotope identification for the contents of the shipping container. The spreader bar is connected to the shipping container for approximately 30 seconds as the container is moved to or from the vessel at a port. The multi-stage radiation verification system enables radiation detection and analysis of the contents within the shipping container within the normal 30 seconds while the spreader bar is connected to the shipping container. The multi-stage system also allows for an extended time-period for the spreader bar to stay connected to the shipping container when radiological materials have been detected that the initial 30 second analysis does not allow adequate time for the identification of the isotopes present. In addition, the multi-stage radiation verification system uses a secondary sensor position for continued analysis of the shipping container if additional time is needed beyond the extended time provided at the spreader bar. The shipping container may be tracked as it moves from the spreader bar position to the secondary position. An example of tracking and monitoring devices include CCTV cameras and wireless tracking technologies such as radio frequency identification devices.

According to an embodiment of the present invention, a crane arm assembly mounted sensor system may comprise a node within a distributed network of radiation sensor positions. An example of such a system is described in U.S. Patent Application No. 60/759,373, Filed on Jan. 17, 2006, and entitled "Distributed Sensor Network With Common Platform For CBRNE Devices", the entire teachings of which being incorporated by reference.

According to an embodiment of the present invention, a crane arm (spreader bar) mounted radiation sensor system, as described in patent application Ser. No. 11/363,594 filed on Feb. 27, 2006 is used for the detection and first stage of isotope identification for detected radiological material within a shipping container.

A sensor concentrator unit may be used to connect multiple sensors in a group and enable efficient connection to the central processor for spectral analysis. This configuration could utilize a sensor interface unit (SIU) that is comprised of an integrated multi-channel analyzer, high voltage power supply, voltage system and communications interface. This SIU configuration uses a concentrator unit to combine multiple sensors into a concentrated communications channel for connection to the central processor. The communications concentrator provides individual IP addressed for each sensor group. An example of the concentrator unit is a device that provides multiple USB ports for sensor connection and concentrates the USB ports into an Ethernet connection for backhaul.

An embedded processor unit may be used to connect multiple sensors in a group and enable efficient connection to the central processor for spectral analysis. This configuration could utilize a sensor interface unit (SIU) that is comprised of an integrated multi-channel analyzer, high voltage power supply, voltage system and communications interface. This SIU configuration is connected to an embedded processor supporting multiple sensors and providing one or more communications channel(s) for connection to the central processor. The embedded processor provides individual IP addressed for each sensor.

According to another embodiment of the present invention, the time that the spreader bar is connected to the shipping container may be extended to enable further analysis and radiological data acquisition.

According to another embodiment of the present invention, the time that the spreader bar is connected to the shipping container may be extended to enable further analysis and radiological data acquisition.

According to another embodiment of the present invention, a secondary radiation verification system could be deployed as another node of the radiation verification system to enable further analysis and radiological data acquisition.

According to another embodiment of the present invention, the targeted shipping container may be tracked and or monitored as it moves to the secondary radiation verification system.

Described now is an example of a multi-stage radiation detection and identification system with one node mounted on a spreader bar of a crane assembly and another node deployed as a secondary radiation verification position. An example of a process for operation of the system is also discussed.

A radiation detection and identification system deployed on a crane arm (or spreader bar) 102, such as illustrated in FIG. 1, provides the first and second stages of a multi-stage radiation verification system. FIG. 1 illustrates example installation positions for various sensor housings 101, 110. Certain inventive features and advantages of exemplary embodiments of a radiation detection and identification system, such as deployed in connection with a crane assembly or other shipping container handling operation, will be discussed below. However, it is assumed that the reader has an understanding of radiation and sensor technologies.

Figure 2:
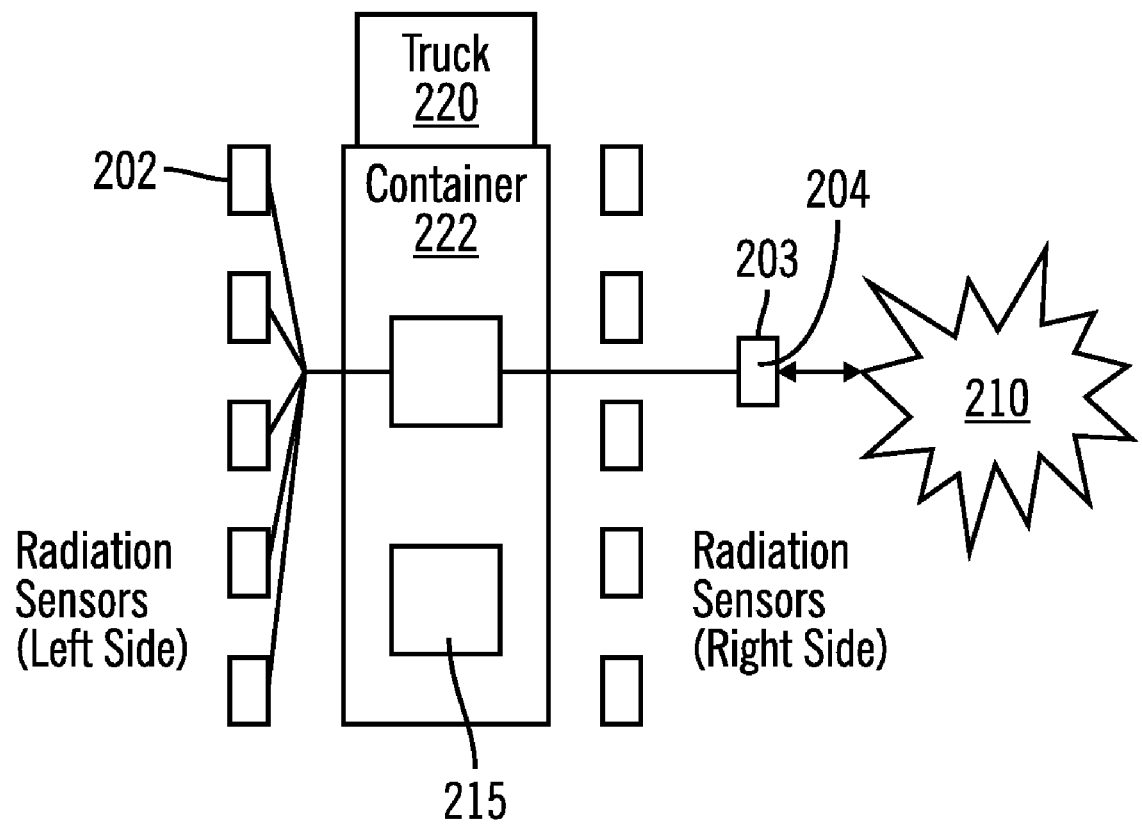
FIG. 2 is a simplified diagram of a secondary radiation verification position.

Referring to FIGS. 1 and 2, an example of a multi-node radiation verification system is shown. The system includes a spreader bar node (as shown in FIG. 1) and a secondary radiation verification node 202 as shown in FIG. 2. A truck 220 carries a container 222 that contains cargo 215 inside the container 222. Multiple radiation sensors 202 are deployed on either or both sides of the container 222 to enable further analysis of the contents 215. A power distribution station 203 provides power to the sensors. A communication distribution module 204 couple signals between the multiple radiation sensors 202 and a distribution network 210 of which is further described in FIG. 3. Once a container cargo 215 is identified at the spreader bar stage as suspect, the container 222 is tracked and moved from the spreader bar position (as shown in FIG. 1) to the secondary verification position (as shown in FIG. 2) for further analysis. In this example, the secondary verification position includes positioning the container 222 by using a truck to move the container 222 to the multiple radiation sensors 202 deployed on either or both sides of the container 222.

Figure 3:
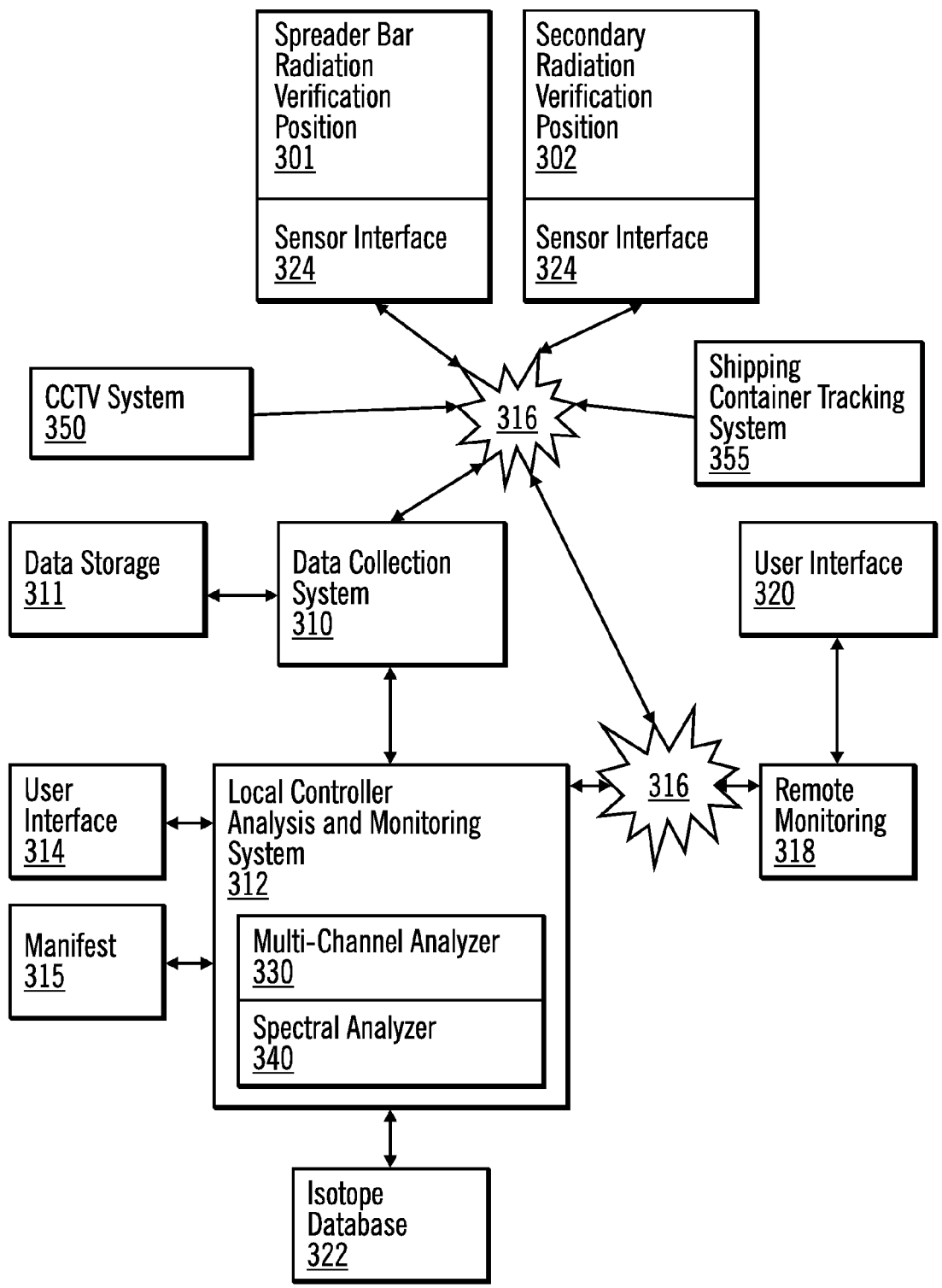
FIG. 3 is a block diagram illustrating an example of a data collection and analysis system, in accordance with an embodiment of the present invention.

With reference to FIG. 3, a data collection system 310, in this example, is communicatively coupled via cabling, wireless communication link, and/or other communication link 305 with each of the gamma radiation sensor devices 301 and neutron sensor devices 302 in each sensor unit, and with each of the neutron pulse sensor device(s) 303. The data collection system 310 includes an information processing system with data communication interfaces 324 that collect signals from the radiation sensor units 301, 302, and from the neutron pulse device(s) 303. The collected signals, in this example, represent detailed spectral data from each sensor device that has detected radiation.

The data collection system 310 is modular in design and can be used specifically for radiation detection and identification, or for data collection for explosives and special materials detection and identification.

The data collection system 310 is communicatively coupled with a local controller and monitor system 312. The local system 312 comprises an information processing system that includes a computer, memory, storage, and a user interface 314 such a display on a monitor and a keyboard, or other user input/output device. In this example, the local system 312 also includes a multi-channel analyzer 330 and a spectral analyzer 340.

The multi-channel analyzer (MCA) 330 comprises a device composed of many single channel analyzers (SCA). The single channel analyzer interrogates analog signals received from the individual radiation detectors 301, 302, and determines whether the specific energy range of the received signal is equal to the range identified by the single channel. If the energy received is within the SCA the SCA counter is updated. Over time, the SCA counts are accumulated. At a specific time interval, a multi-channel analyzer 330 includes a number of SCA counts, which result in the creation of a histogram. The histogram represents the spectral image of the radiation that is present. The MCA 330, according to one example, uses analog to digital converters combined with computer memory that is equivalent to thousands of SCAB and counters and is dramatically more powerful and cheaper.

The histogram is used by the spectral analysis system 340 to identify isotopes that are present in materials contained in the container under examination. One of the functions performed by the information processing system 312 is spectral analysis, performed by the spectral analyzer 340, to identify the one or more isotopes, explosives or special materials contained in a container under examination. With respect to radiation detection, the spectral analyzer 340 compares one or more spectral images of the radiation present to known isotopes that are represented by one or more spectral images 350 stored in the isotope database 322. By capturing multiple variations of spectral data for each isotope there are numerous images that can be compared to one or more spectral images of the radiation present. The isotope database 322 holds the one or more spectral images 350 of each isotope to be identified. These multiple spectral images represent various levels of acquisition of spectral radiation data so isotopes can be compared and identified using various amounts of spectral data available from the one or more sensors. Whether there are small amounts (or large amounts) of data acquired from the sensor, the spectral analysis system 340 compares the acquired radiation data from the sensor to one or more spectral images for each isotope to be identified. This significantly enhances the reliability and efficiency of matching acquired spectral image data from the sensor to spectral image data of each possible isotope to be identified. Once the one or more possible isotopes are determined present in the radiation detected by the sensor(s), the information processing system 312 can compare the isotope mix against possible materials, goods, and/or products, that may be present in the container under examination. Additionally, a manifest database 315 includes a detailed description of the contents of each container that is to be examined. The manifest 315 can be referred to by the information processing system 312 to determine whether the possible materials, goods, and/or products, contained in the container match the expected authorized materials, goods, and/or products, described in the manifest for the particular container under examination. This matching process, according to an embodiment of the present invention, is significantly more efficient and reliable than any container contents monitoring process in the past.

The spectral analysis system 340, according to an embodiment, includes an information processing system and software that analyzes the data collected and identifies the isotopes that are present. The spectral analysis software consists of more that one method to provide multi-confirmation of the isotopes identified. Should more than one isotope be present, the system identifies the ratio of each isotope present. Examples of methods that can be used for spectral analysis such as in the spectral analysis software according to an embodiment of a container contents verification system, include: 1) a margin setting method as described in U.S. Pat. No. 6,847,731; and 2) a LINSCAN method (a linear analysis of spectra method) as described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

With respect to analysis of collected data pertaining to explosives and/or special materials, the spectral analyzer 340 and the information processing system 312 compare identified possible explosives and/or special materials to the manifest 315 by converting the stored manifest data relating to the shipping container under examination to expected explosives and/or radiological materials and then by comparing the identified possible explosives and/or special materials with the expected explosives and/or radiological materials. If the system determines that there is no match to the manifest for the container then the identified possible explosives and/or special materials are unauthorized. The system can then provide information to system supervisory personnel to alert them to the alarm condition and to take appropriate action.

Removal of Background Radiation Effects
Dynamic Background

The background radiation at a seaport and more specifically the changing background associated with a moving container across land, sea, vessels and at different heights, poses a specific challenge to radiation detection and isotope identification. According to one embodiment of the present invention, this issue is addressed through the use of a dynamic background method used to compensate for the changing background effects. This method applies continuous background updates against the main background data. Different weights and intervals can be varied for the background updates to achieve the appropriate dynamic background for the specific application. An example formula is provided below, and also shown in FIG. 9.

$$Bi(X) = Ai(X) * \text{alpha} + Bi\text{-}1(X) * (1\text{-alpha}) \quad (1)$$

| $Bi(X) =$ | $Ai(X)$ | $*\text{alpha}$ | $+Bi\text{-}1(X)$ | $*(1\text{-alpha})$ |
|---|---|---|---|---|
| New Dynamic Background | Snap Shot of Background | Learning Rate | Previous Background | Differential |

Figure 7:
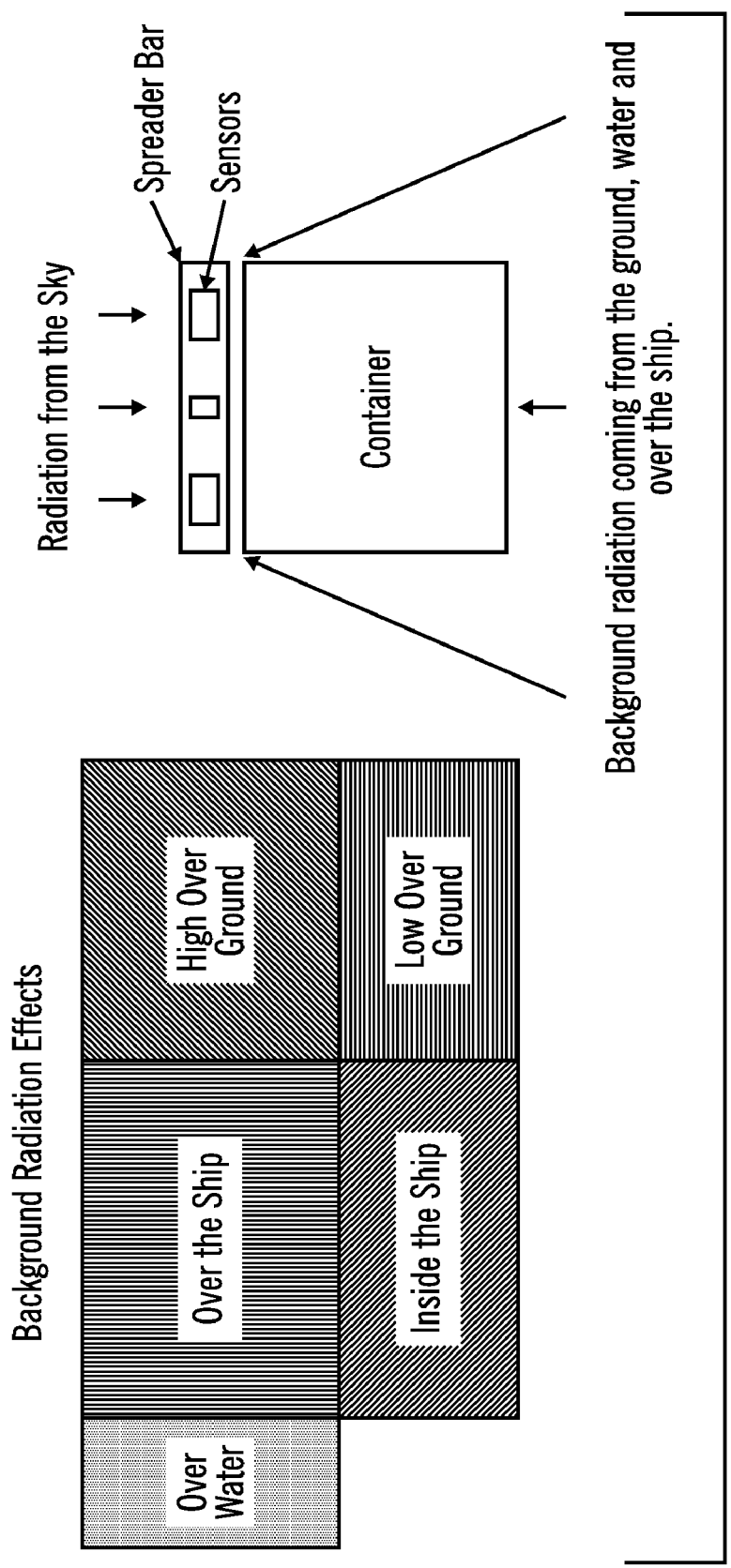
FIG. 7 is a diagram illustrating multiple background radiation environment effects.

As shown in FIG. 7, background radiation effects can vary depending on a varying background environment that can be experienced by the sensors, such as the sensors located at the spreader bar and/or sensors located at locations relative to changing background environments. For example, the sensors at the spreader bar can be over water, over a ship, high over the ground, low over the ground, or inside the ship. These different background environments can affect the radiation detection and isotope identification. Radiation from the sky should typically be predominant and remain normal during spreader bar movement. Also, sensors at the spreader bar should typically be protected by the container under examination and the spreader bar from most of the background radiation coming from the ground, water, and over the ship. Accordingly, a new and novel approach to compensate for the changing background effects applies continuous background updates against the main background data.

Figure 8:
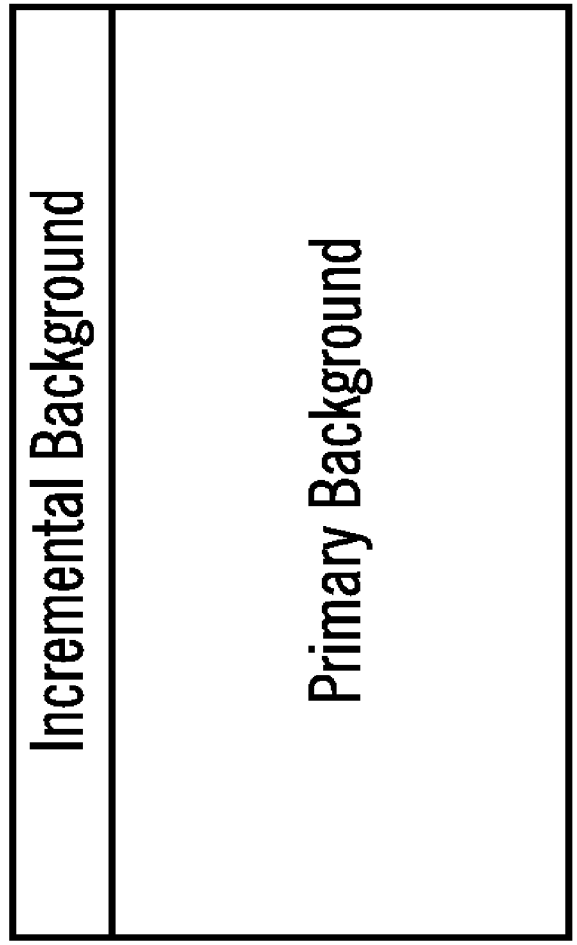
FIG. 8 is a diagram illustrating dynamic background radiation effects compensation.

As shown in FIG. 8, the dynamic background is comprised of the primary background and the incremental background. As radiation data is collected and processed for analysis, according to one embodiment of the present invention, the background environment effects can be subtracted from the collected data using continuous background updates against a main background data. This dynamic background compensation approach has the advantages of increased speed and sensitivity for dynamic background capture, memory efficiency in processing collected data, and flexibility to adjust to variable system parameters and to address specific applications. Further, an information processing system can learn a particular process used in locating sensors during data collection, such as to anticipate the changes in background effects in a normal operation and movement of the spreader bar. Additionally, the dynamic background compensation approach can provide a continuous differential subtraction of the effects of varying background environment. This approach enhances the quality of the analyzed data leading to better and more reliable radiation detection and isotope identification.

According to an alternative embodiment of the present invention, a multiple background analysis approach can be used to remove varying background effects on the collected data. In one example, a GPS detector is mechanically coupled to the structure supporting the moving sensors, such as the crane spreader bar, and provides continuous location data (of the spreader bar) to an information processing system that is processing the collected data. The location of the spreader bar, for example, can indicate the type of background environment that is being experienced by the sensors at the spreader bar. The GPS detector operates in a well known manner and can provide both geographic location information and elevation information. Knowing the elevation of the spreader bar above, say, ground or sea level, can indicate the type of background effects that are experienced by the sensors at the spreader bar. The elevation information, and/or the geographic location information, can be, for example, compared against an expected map of structures and background environments in proximity to the spreader bar. These expected background environments correspond to background effects that can, for example, be subtracted from the collected data to provide better and more reliable data for analysis leading to better and more reliable radiation detection and isotope identification. Alternative location detection devices, including mechanical devices and/or electrical devices and/or manual data entry, can be used by the system to track changing backgrounds and corresponding background effects on collected data.

Another use of the elevation information and the geographic location information by an information processing system is for controlling the triggers and effects of devices used to collect the radiation data. For example, a neutron pulse may be generated by a neutron pulse device that is included in the sensor system deployed at the spreader bar or on the gantry crane to provide an active analysis whereby gamma feedback following the neutron pulse can identify shielded radiological materials such as highly enriched uranium, explosives or illicit drugs, inside containers. However, a particular system implementation may limit the activation of the neutron pulse device to particular geographic areas and/or elevations above ground and/or sea level. For example, a neutron pulse device can be controlled to remain inactive while the crane and/or spreader bar are in close proximity to a crane operator's cabin or to a protected area such as one normally occupied by people. The flexibility and dynamic adjustment to different operational environments while enhancing the speed and reliability of data analysis, as discussed above, is a significant advantage of the present inventive system that was not available in the past.

The user interface 314 allows service or supervisory personnel to operate the local system 312 and to monitor the status of radiation detection and identification of isotopes and/or the detection of RF signals by the collection of sensor units 301, 302 and 303 deployed on the frame structure, such as on the crane arm assembly (or spreader bar).

The user interface 314, for example, can present to a user a representation of the collected received returning signals, or the identified possible explosives and/or special materials in the shipping container under examination, or any system identified unauthorized explosives and/or special materials contained within the shipping container under examination, or any combination thereof.

The data collection system can also be communicatively coupled with a remote control and monitoring system 318 such as via a network 316. The remote system 318 comprises an information processing system that has a computer, memory, storage, and a user interface 320 such as a display on a monitor and a keyboard, or other user input/output device. The network 316 comprises any number of local area networks and/or wide area networks. It can include wired and/or wireless communication networks. This network communication technology is well known in the art. The user interface 320 allows remotely located service or supervisory personnel to operate the local system 312 and to monitor the status of shipping container verification by the collection of sensor units 301, 302 and 303 deployed on the frame structure, such as on the crane arm assembly (or spreader bar). The central monitoring system can display the position of the shipping container as it is moved to the secondary position through the use of CCTV cameras (350) or shipping container tracking systems (355).

A neutron pulse device can be included in the sensor system deployed on the spreader bar or on the gantry crane to provide an active analysis whereby gamma feedback identifies shielded radiological materials such as highly enriched uranium, explosives or illicit drugs.

Figure 4:
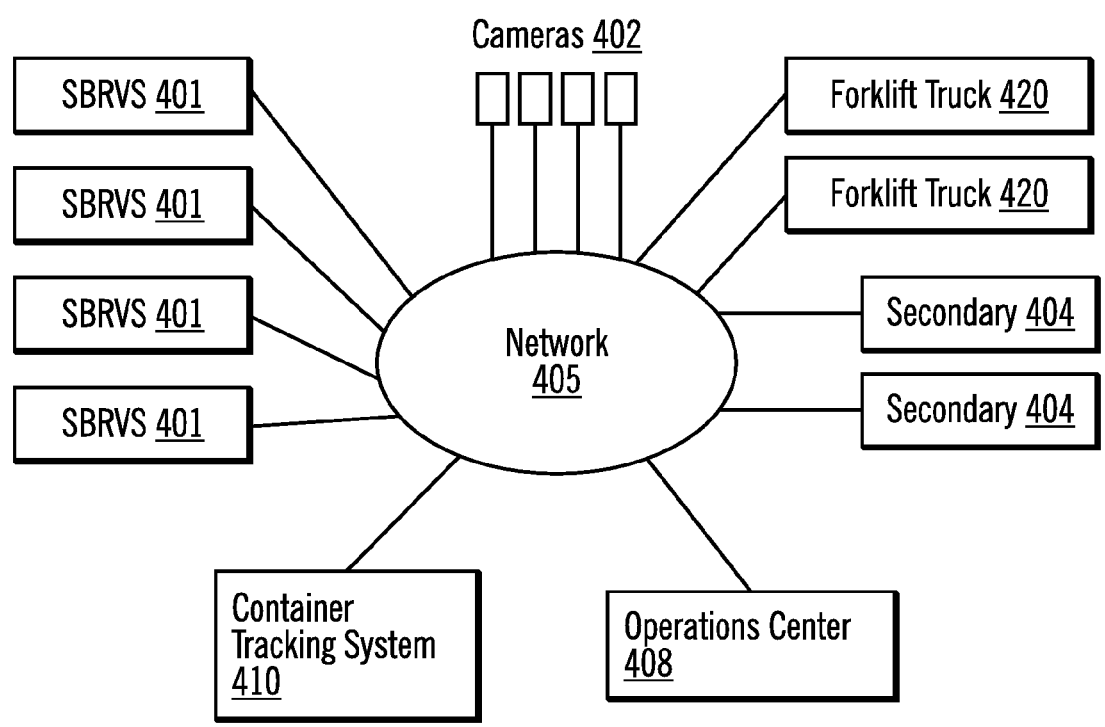
FIG. 4 is a block diagram illustrating an example of a central monitoring system, in accordance with an embodiment of the present invention.

Referring to FIG. 4, an example of a multi-node radiation verification system includes multiple spreader bar radiation verification systems (401) and secondary radiation verification nodes (404), operations center (408), container tracking system (410) and CCTV (402) cameras that are interconnected by a data network (405). In some cases a forklift truck is used to move the containers around the terminal. The forklift truck (420) is equipped with a spreader bar and can be configured as a wireless radiation verification node.

Figure 5:
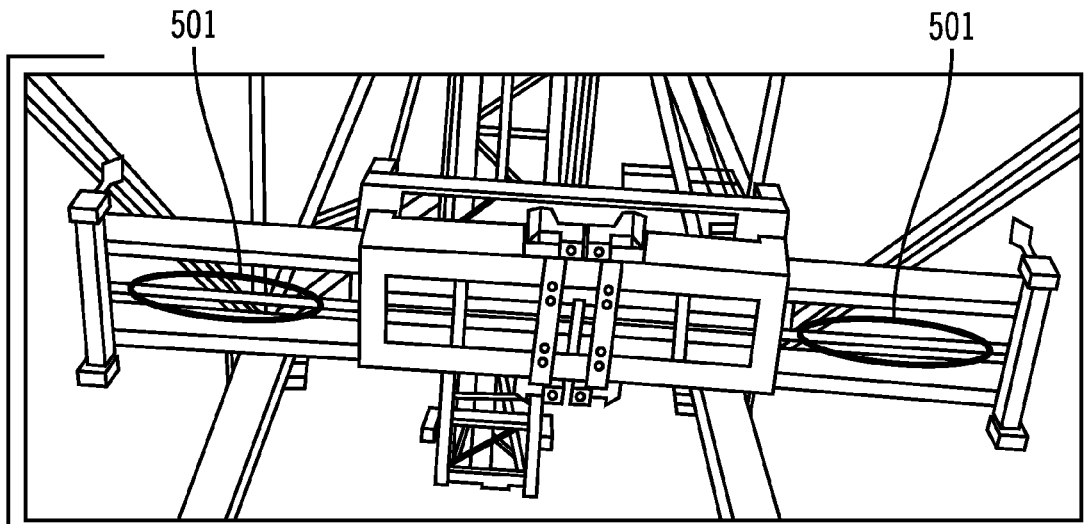
FIG. 5 is a diagram illustrating radiation sensors deployed in a push pull bar configuration of a crane spreader bar, according to an embodiment of the present invention.
Figure 5:
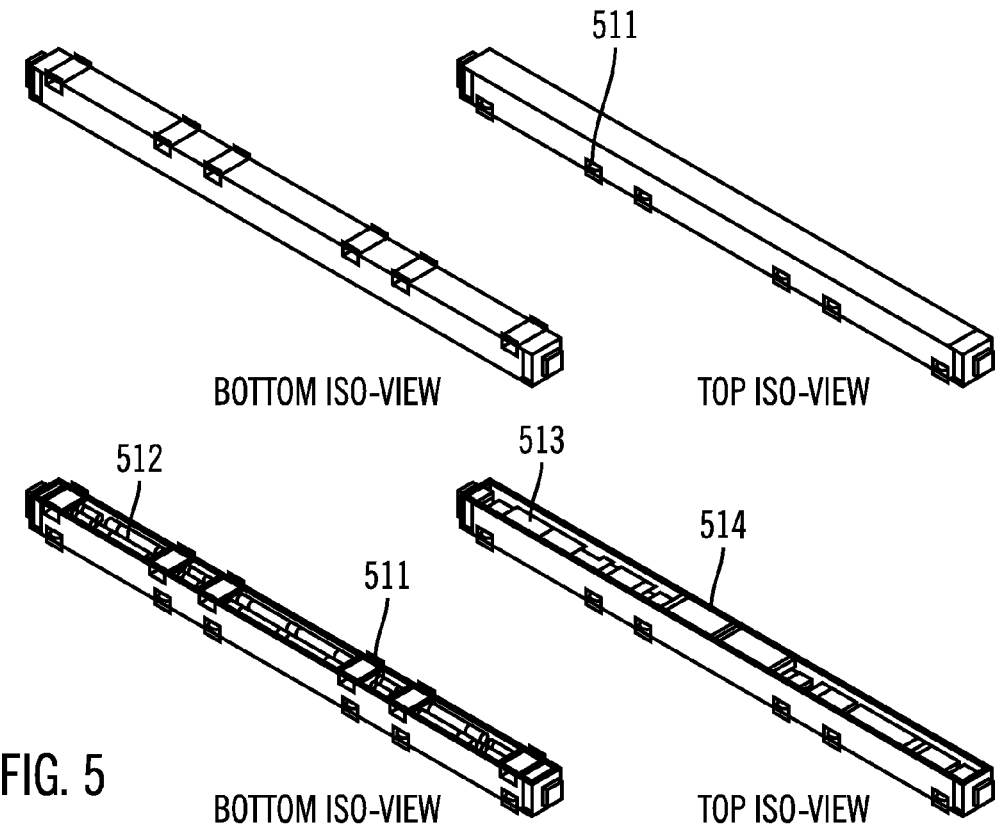

Referring to FIG. 5, an example of a spreader bar with radiation sensors installed in the push pull bars is shown. In FIG. 5, one or more radiation sensors are integrated within the push pull bar 501. The radiation sensors are enclosed in a box with shock absorbing connectors 511. The gamma sensors 512 are shock mounted within the box on the lower side of the unit. The one or more gamma sensors comprise sensor resolution of 7% or better at 662 kev. The neutron sensors 514 and the supporting electronics 513 are mounted on the top side of the box. Alternative mounting arrangements of the one or more radiation sensors, the gamma sensors 512, the neutron sensors 514, and the supporting electronics 513, relative to the push pull bar 501 should become obvious to those of ordinary skill in the art in view of the present discussion.

Figure 6:
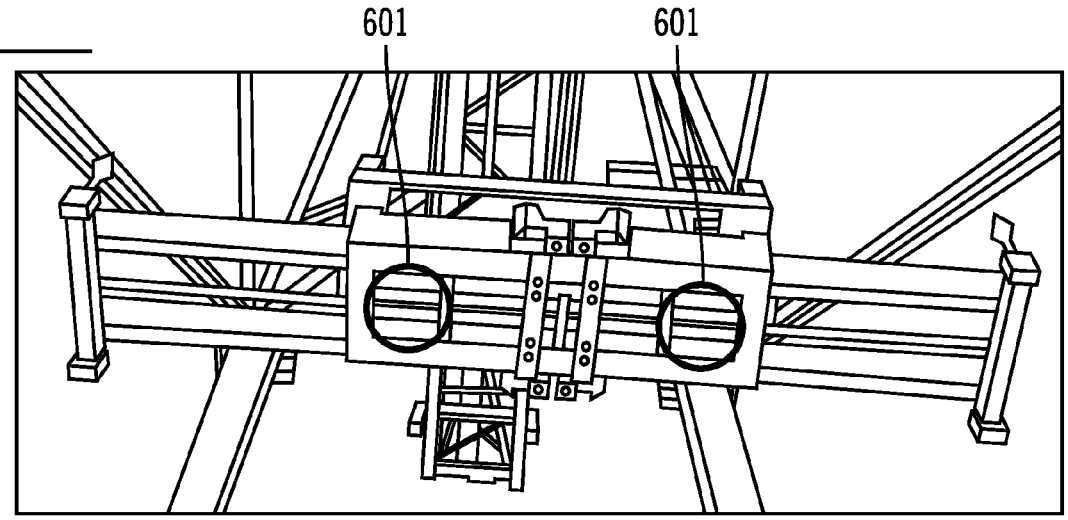
FIG. 6 is a diagram illustrating radiation sensors deployed about the main body of a crane spreader bar, according to an embodiment of the present invention.
Figure 6:
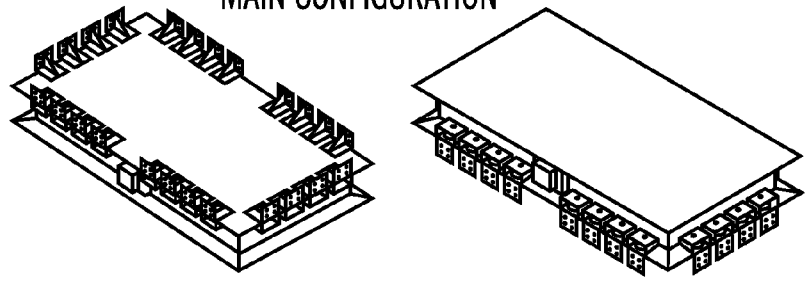
Figure 6:
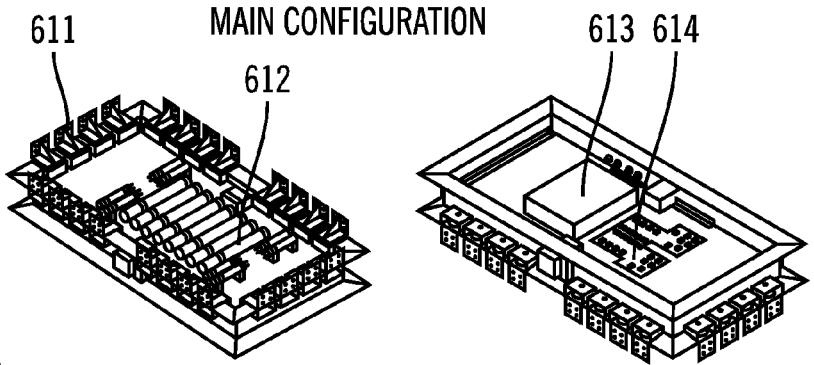

Referring to FIG. 6, an example of a spreader bar with radiation sensors installed in the main unit 601 is shown. In the example of FIG. 6, the radiation sensors are integrated within the main unit 601. The radiation sensors are enclosed in a box with shock absorbing connectors 611. The gamma sensors 612 are shock mounted within the box on the lower side of the unit. The neutron sensors 613 and the supporting electronics 614 are mounted on the top side of the box. Alternative mounting arrangements of the one or more radiation sensors, the gamma sensors 612, the neutron sensors 613, and the supporting electronics 614, relative to the main unit 601 should become obvious to those of ordinary skill in the art in view of the present discussion.

By operating the system remotely, such as from a central monitoring location, a larger number of sites can be safely monitored by a limited number of supervisory personnel. Besides monitoring container handling operations such as from crane arm assemblies, as illustrated in the example of FIG. 1, it should be clear that many different applications can be deployed for the initial detection and identification stages for container analysis. For example, fork lift truck mounted sensor units communicating with a remote monitoring system allow radiation detection and identification where large amounts of cargo are moved and handled, such as at ports, railway, and intermodal stations, and at ships, airplanes, trucks, warehouses, and other carrier environments, and at such other places that have large amounts of cargo to handle as should be understood by those of ordinary skill in the art in view of the present discussion.

Additionally, the system monitoring function can be combined to monitor more than radiation and explosives. Other types of hazardous elements can be monitored in combination with the radiation detection by combining appropriate sensors and detectors for these other types of hazardous elements with the radiation sensor units and monitoring system according to alternative embodiments of the present invention.

The preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

An embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A sensor interface system for interfacing with a collection of one or more sensors that can sense chemical, biological, radiation, nuclear, and explosives (CBRNE) materials, the sensor interface system comprising:
   one or more digital and/or analog sensor interfaces for coupling with one or more sensors comprising: chemical sensors, biological sensors, radiation sensors, nuclear sensors, and explosives sensors;
   a processor, communicatively coupled with the one or more digital and/or analog sensor interfaces, configured for receiving and processing signals from the one or more digital and/or analog sensor interfaces, and when the one or more sensors include a radiation sensor and/or nuclear sensor, the processor further configured for differentiating between gamma pulses and neutron pulses, by:
   receiving a signal from an output of a neutron detector;
   analyzing a pulse shape of the signal;
   differentiating the pulse shape between gamma pulses and neutron pulses; and
   determining that the pulse shape of the signal is one of a gamma pulse and a neutron pulse.

2. The system of claim 1, further comprising:
a voltage power supply module, coupled with the one or more digital and/or analog sensor interfaces, for supporting one or more sensors connected to the one or more digital and/or analog sensor interfaces, respectively, and with software controls to adjust the power for calibration of the one or more sensors;
a software control interface, coupled with each one or more digital and/or analog sensor interfaces and with the processor, to couple software controls to the one or more digital and/or analog sensor interfaces to adjust for calibration of sensors coupled with the one or more digital and/or analog sensor interfaces.

3. The system of claim 1, further comprising:
a digital data collection system, communicatively coupled with the one or more digital and/or analog sensor interfaces, for collection of sensor data from the one or more digital and/or analog sensor interfaces.

4. The system of claim 3, further comprising:
a multi-channel analyzer system, communicatively coupled with the digital data collection system, for preparing histograms of the collected sensor data;
a spectral analysis system, communicatively coupled with the multi-channel analyzer system and the digital data collection system, for receiving and analyzing the collected sensor data to detect radiation and to identify one or more targeted materials associated with the sensor data;
a first data storage means for storing data representing chemical, biological, radiation, nuclear and explosives (CBRNE) material spectra for use by the spectral analysis system, where one or more spectral images stored in the first data storage unit represent each CBRNE material the first data storage means being communicatively coupled with the spectral analysis system;
an information processing system, communicatively coupled with the spectral analysis system, for analyzing the identified one or more targeted CBRNE materials and to determine the possible materials or goods that they represent; and
a second data storage means for storing data representing a manifest relating to a container or object under examination, the second data storage means being communicatively coupled with the information processing system, the information processing system further for comparing the determined possible materials or goods with a manifest relating to a container or object under examination to determine if there are unauthorized materials or goods contained within the container, or in the object, under examination.

5. The system of claim 1, further comprising:
at least one analog signal to digital data converter for converting signals from analog sensors that are coupled with the one or more digital and/or analog sensor interfaces, to digital data.

6. The system of claim 1, further comprising:
an individual TCP/IP address associated with each of the one or more digital and/or analog sensor interfaces.

7. The system of claim 1, wherein the processor uses a reference signal associated with the one or more radiation sensors to adjust the received radiation data from the one or more radiation sensors to obtain proper calibration of the received radiation data.

8. The system of claim 1, wherein the processor uses a reference temperature signal associated with the one or more radiation sensors to adjust the received radiation data from the one or more radiation sensors to obtain proper calibration of the received radiation data.

9. The system of claim 1, further comprising:
a communications device, communicatively coupled with the processor, for coupling digital data representing signals from one or more sensors coupled with the one or more digital and/or analog sensor interfaces, to a communications port or network.

10. The system of claim 9, wherein the sensor data to be communicated to the communications port or network is configured to address a wide variety of data communications ports or networks.

11. The system of claim 10, further comprising:
an individual TCP/IP address associated with each of the one or more digital and/or analog sensor interfaces.

* * * * *